G. W. BEVIS.
Corn-Planter.

No. 222,445.    Patented Dec. 9, 1879.

WITNESSES
John A. Peir.
W. C. Masi

INVENTOR
George W. Bevis,
by E. W. Anderson
ATTORNEY

UNITED STATES PATENT OFFICE.

GEORGE W. BEVIS, OF CENTRE POINT, INDIANA.

IMPROVEMENT IN CORN-PLANTERS.

Specification forming part of Letters Patent No. 222,445, dated December 9, 1879; application filed April 21, 1879.

*To all whom it may concern:*

Be it known that I, GEORGE WASHINGTON BEVIS, of Centre Point, in the county of Clay and State of Indiana, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1:
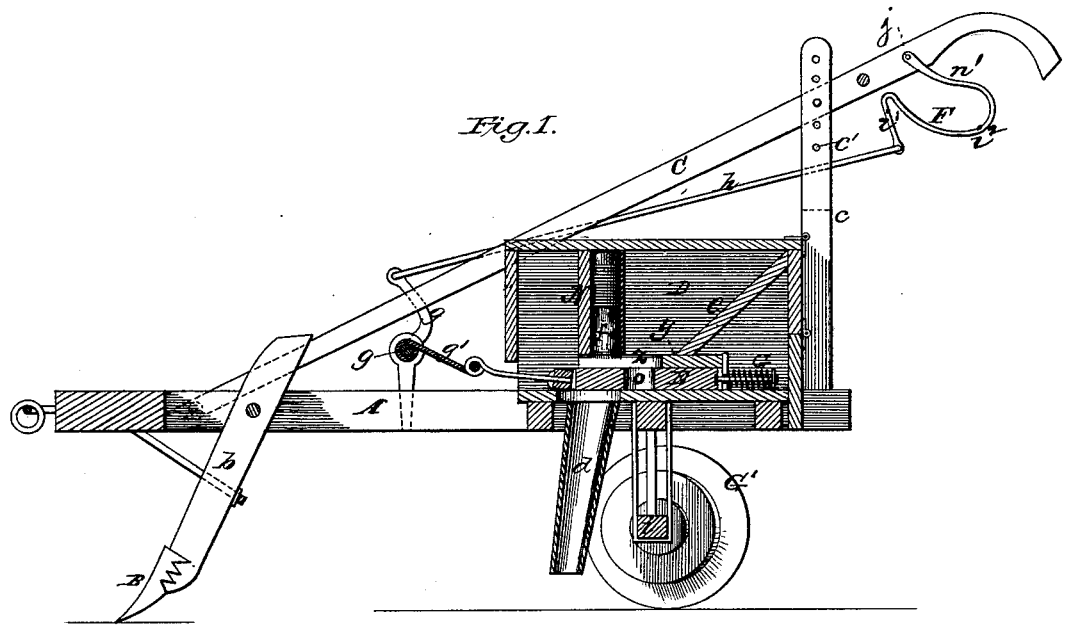
Figure 2:
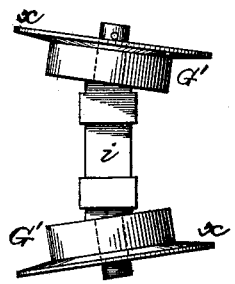
Figure 3:
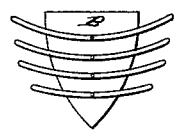

Figure 1 of the drawings is a representation of a sectional elevation of my improved corn-planter. Fig. 2 is a detail plan view of the transporting and covering wheels, and Fig. 3 is a similar front view of a modification of the furrowing-shovel and clod-breaker.

This invention has reference to certain improvements in corn-planters, the object of which is to simplify the mechanism for planting or dropping the corn and the means for covering the planted corn; and it consists in the employment of a rod the forward end of which is connected to a crank-shaft, strapped or otherwise fastened to the corn-dropper proper, or valve having a reaction-spring, the rear end of said rod having a peculiarly-shaped lever adapted to permit the operation of the rod by the hand without removal from the handle of the machine; and, secondly, in the arrangement and adaptation of the transporting-wheels to cover the planted corn, substantially as hereinafter more fully set forth.

In the accompanying drawings, A marks the frame, which is tapered at its forward end, so as to form a single point, for greater convenience in the attachment thereto of the hitching-staple or clevis for the horse or team. B is the plow or shovel for opening the ground preparatory to receiving the corn, which plow is provided with serrated wings $w$, as seen in Fig. 1, or with a series of parallel bars, as seen in Fig. 3, projecting from its sides, to strike and pulverize clods. The plow B is attached to a standard, $b$, adjusted and braced in the forward end of the frame A in a forwardly-inclined position. C C are the handles, with their front ends fastened to the sides of the same end of the frame A, and their rear ends supported in vertical slots in uprights or standards $c$, fastened to the rear ends of the side pieces of the frame A. The slotted portions of the uprights $c$ are also provided with series of perforations $c'$, which receive pins passing through the handles C, to permit the vertical adjustment of the handles to accommodate them to the height of the person or attendant.

D is the corn-receptacle, which may be provided with an additional door at its rear end to aid in cleaning the receptacle. Affixed to the under side of the bottom of this receptacle, in a line with the corn-opening, is the leg or chute $d$, for conducting the corn to the ground.

E is the dropper-slide, working endwise through the hopper, and having a perforation which, when in line with that in the hopper, allows a planting of corn to be dropped into the furrow. The dropper-slide is inclosed within a case, $y$, fastened to the bottom of the corn-receptacle, in the top of which case is an opening, $z$, through which the corn is fed to the opening in the slide. An incline, $e$, facilitates the feeding of the corn to the valve or dropper.

$f$ is a brush-striker, secured in a case or inclosure, N, fastened to the receptacle D, and so arranged with relation to the valve-opening of the dropper proper as to regulate the amount of corn fed to said opening.

$g$ is a crank-shaft, hung in staples or boxes fastened to the frame A, and having an arm, $g'$, strapped or otherwise connected to the valve or dropper proper, E. To this shaft is connected a rod, $h$, extending rearwardly within a short distance from the rear end of one of the handles C, where it is connected to the handle by a lever, F. This lever is of the following construction: Its portion next to rod $h$ is rectilinear and flexibly connected thereto usually by a hook device, the said portion $i'$ being at right angles, or nearly so, to the rod $h$. It is then bent downward in loop form, as shown at $i^2$, and its end connected by means of a pivot, $j$, to the handle C. Usually the free end of the lever is forked and straddles the handle, pivot $j$ extending through perforations in the fork and handles. This lever is usually made of a single piece of stout wire of sufficient rigidity, and its outer branch, $n'$, is sufficiently near to be grasped by the fingers, while the plow-handles are held by the thumb and palm of the hand. When this lever is drawn back the dropper-slide is drawn to the front, its opening brought in line with that of the hopper-bottom, and a planting is dropped into the spout, an excess being swept off by the striker $f$.

The spring G, fastened to the rear end of the valve or dropper E and to a stud fastened to the bottom of the receptacle D, under the incline $e$, by its reaction upon the valve, after each forward movement of the latter, gives the valve a backward impulse the moment pressure is removed from the lever F, which lever, as already intimated, is to impart to the valve its forward movement.

G′ G′ are the wheels, with their axle $i$ fixed in a dependent position to the under side of the frame A, as shown, or otherwise. These wheels are provided with flanges $x$ on their edges, after the fashion of car-wheels, and are arranged obliquely upon their axle, as shown in Fig. 2, with their rear surfaces converging more or less toward each other, by which they are caused to cover up the corn after its planting.

Having thus fully described my invention, I claim and desire to secure by Letters Patent—

In a corn-planter, the bearing-wheels G′, having covering-flanges $x$ upon their outer edges, arranged in the plane of the wheels, and arranged obliquely on their axle, with their rear edges converging more or less toward each other, substantially as specified.

In testimony that I claim the above I have hereunto subscribed my name in the presence of two witnesses.

GEORGE WASHINGTON BEVIS.

Witnesses:
   JAMES M. BEVIS,
   JAMES T. LEACHMAN.